United States Patent Office 3,483,295
Patented Dec. 9, 1969

3,483,295
THE CONTROL OF RICE BLAST DISEASE ON RICE PLANTS USING TRIPHENYLTIN COMPOUNDS
Amon D. Dacus, Shreveport, La., assignor to Thompson Hayward Chemical Co., Kansas City, Kans., a corporation of Delaware
No Drawing. Continuation-in-part of application Ser. No. 524,481, Feb. 2, 1966. This application Nov. 24, 1967, Ser. No. 685,323
Int. Cl. A01n 9/24, 9/30, 17/00
U.S. Cl. 424—288                            5 Claims

ABSTRACT OF THE DISCLOSURE

This invention relates to the control of rice blast disease which comprises periodically contacting rice plants exposed to rice blast disease with a small but effective amount of a compounds of the formula:

wherein each R is phenyl and X is halo, hydroxy or acyloxy.

---

This application is a continuation-in-part of a prior application, Ser. No. 524,481, filed Feb. 2, 1966, now abandoned. This invention relates to methods of controlling certain diseases of plants and compositions useful for such methods, and more particularly, this invention relates to methods of controlling certain diseases of the rice plant and compositions useful for such purpose.

Rice is one of the principal food crops grown in the world, and in fact is the staple food crop for over half the world's population. Rice growers lose a substantial part of their crop each year because of the diseases to which the rice plant is susceptible. In fact, in the leading rice-producing states of the United States these diseases reduce the average annual yield by about five percent (5%), which represents a loss of more than 100,000 tons of the grain per year.

One of the major diseases of rice is rice blast disease, also known as rotten neck, brusone or pericularia blight. Rice blast disease is caused by the fungus, Pericularia oryzae, which frequently attacks the neck of the plant, blighting the head. In addition, the branches of the head, the nodes of the stem, and the joint where the leaf blade joins the sheath are all subject to attack by the disease. In severe cases, the plant is stunted and loses nearly all its leaves or the whole plant, including the tillers is killed.

In general, rice blast disease has occurred in a scattered rather than a widespread way and has, for some reason not entirely understood, often been severe on newly cleared land and on land cropped to rice for the first time in several years. Thus, it is difficult, if not impossible to predict in advance when or where the disease will strike. Thus, when one field is infected, an adjoining one may may not be, and absence of the disease in adjoining fields is no guarantee that nearby fields will not be infected. Therefore, a general and uniform method of combatting this disease in an economical and efficient manner is necessary. Treating an entire rice crop must be accomplished in order to effectively combat this disease.

Heretofore, it has been attempted to combat rice blast disease by many different methods. One method the farmer has employed to combat the disease has been to plant a variety of rice which supposedly is resistant to Pericularia oryzae. However this method is unsuccessful in that the resistant rice has been found not to resist all the different races of fungus. Another method employed has been the flooding of the fields containing the infected plants. This method also has been found to be unsatisfactory due to the fact that in addition to being employable only in connection with young plants, it does not result in the eradication of the disease but merely in the slowing down thereof.

In addition to the foregoing, many chemical fungicides have been employed in an attempt to control the disease. failure, in that it would appear that rice blast disease is specific and requires a specific agent for control and prevention. It has now been found that rice blast disease can be effectively prevented and/or controlled by the employment of the novel methods of this invention and the compositions useful therefore. This serious disease of rice can be effectively controlled and/or prevented by the periodic administration at specific times, on or about the rice plants exposed to rice blast disease of a small but effective amount of the novel compositions of this invention.

The novel compositions of this invention comprise as the principal active ingredient thereof a member of the group consisting of compounds of the formula:

wherein each R is phenyl and X is selected from the group consisting of hydroxy, acyloxy, for example acetoxy, and halogen, for example, bromo or chloro; said compound dispersed in a substantial amount of a suitable extending agent. In the preferably embodiment of this invention, X is selected from the group consisting of chloro, hydroxy and acetoxy.

The preferred acyloxy radicals are those of hydrocarbon carboxylic acids of less than twelve carbon atoms, as exemplified by the lower alkanoic acid (e.g. acetic, propionic, butyric and tert. pentanoic acids); the lower alkenoic acids, the monocyclic aryl carboxylic acids (e.g. benzoic and toluic acids), the monoalicyclic aryl lower alkanoic acids (e.g. phenacetic and β-phenylpropionic acids), the cycloalkane carboxylic acids and the cycloalkene carboxylic acids. Most preferred are the acyloxy radicals derived from the lower alkanoic acids, for example, acetic acid and propionic acid.

In this disclosure and in the claims appended thereto, the term "dispersed" is used in its widest possible sense. When it is said that the compounds of this invention are dispersed it means that the particles may be molecular in size and held in true solution in a suitable solvent. It means further that the particle may be colloidal in size and dispersed through a liquid phase in the form of suspension or emulsions or in the form of particles held in suspension by wetting agents. It also includes particles which are dispersed in a semi-solid viscous carrier such as petrolatum or soap in which they may be actually dissolved in the carrier or held in suspension in the carrier with the aid of suitable emulsifying or wetting agents. The term "dispersed" also means that the particles may be mixed with and spread throughout a solid carrier so that the mixture is in the form of powder or dust. The term "dispersed" also includes mixtures which are suitable for use as aerosols including solutions, suspensions or emulsions of the agents of this invention in a carrier such as Freon which boils below room temperature at ordinary pressure.

The term "extending agent" as used in this disclosure and in the appended claims, includes any and all of those agents in which the compounds of the instant invention are dispersed. It includes, therefore, the solvents of a true solution, the liquid phase of suspensions, emulsions or aerosols, the semi-solid carrier of ointments and the solid phase of dust and powders.

It has been found that the compounds of this invention are active when dispersed in an extending agent at concentrations of 0.01% by weight or even lower. This concentration is effective when the dispersing agent is a liquid, but it is preferred to use more concentrated mixtures when the dispersing agent is a semi-solid or a solid. This is because liquid dispersions which are, of course, suitable for use as sprays give a more intimate contact with the plants and the disease organism than the solid dispersions and, therefore, lower concentrations are more effective with liquid dispersions.

There are a number of solvents which can be utilized for the preparation of solutions, suspensions or emulsions of the compounds of the invention. High boiling oils of vegetable origin such as castor oil or olive oil have been found to be suitable. Low boiling, more volatile solvents such as acetone, methylene chloride, and alcohols, including methanol and ethanol, benzene, toluene and the like are also useful. For certain applications it may be advantageous to resort to mixtures of solvents.

If the active agents are to be applied as aerosols, it is convenient to dissolve them in a suitable solvent and to disperse the resulting solution in a liquid such as Freon which boils below room temperature. For such applications it is better to employ true solutions of the active agent although it is possible to employ suspensions or emulsions of the active agent.

The agents of this invention are often dispersed either ing the form of emulsions or suspensions, in an inert carrier with the aid of a capillary active substance. Such capillary substances may be anion-active, cation-active or non-ionizing. There may be mentioned by way of example, natural or synthetic soaps, turkey-red oil, fatty alcohol sulfonates, esters of fatty acids and the like. Other examples include high molecular weight quaternary ammonium compounds as well as condensation products of ethylene and propylene oxide with alkyl phenols or monhydric and polyhydric alcohols.

For use as a powder or dust the active ingredients of this invention may be mixed with any of a number of extending agents either organic or inorganic in nature whch are suitable for the manufacture of pulverulent preparations. In addition to mixing the ingredients directly the active compounds of this invention may first be dissolved in a suitable solvent and the dry extending agents may be treated with the resulting solution so that after the solvent evaporates off the active ingredient is effectively impregnated on the extending agent. The extending agents which may be employed include, for example, tricalcium phosphate, calcium carbonate, kaolin, attapulgite, diatomite, dolomite, gypsum, pyrophyllite, montmorillonite, bole, kiesselguhr, talc, calcined magnesia, boric acid and others. Materials of vegetable origin such as powdered cork, soybean flour, powdered tobacco, ground corn cobs, powdered wood and powdered walnut shells are also useful. These mixtures may be used in the dry form or, by the addition of wetting agents, the dry powder can be rendered wettable by water so as to obtain stable aqueous dispersions suitable for use as sprays.

It has been found that satisfactory results are obtained when the active ingredient of this invention is present in an amount of from about 1.0% to about 50.0% by weight of the final composition and most preferably in an amount of from about 10.0% to about 30.0%. Optimal results are obtained when from about 15.0% to about 25.0% by weight of the principal active ingredient is incorporated in this final product of this invention.

The compositions of this invention must be employed in the treatment of rice plants in a particular manner. Unlike the usual fungicide formulations, the compositions of this invention must be periodically applied on or about the plants sought to be treated at specific times in the plant's life in order to obtain satisfactory results.

Generally speaking, it has been found that the novel compositions of this invention must be applied periodically, in two separate applications each of which must be made at a specific time in the plant's life. It has been discovered that satisfactory results are not obtained when applications are made at different times and the disease is not satisfactorily controlled. The method of this invention requires that the first application of the compositions of this invention to rice plants exposed to Rice Blast Disease be made when the rice plant is at the "boot" stage. (By "boot" stage it is here meant that stage in which the head is formed in the stalk but has not emerged from the sheath of the flag leaf.) The second application must be made to the rice plants from five to ten days after the first application, when the plant is at the "heading" stage. (By "heading" stage it is here meant that stage when most of the heads of the plants are out.) It has been found that later or earlier applications of the compositions of this invention to rice plants exposed to the disease results in inadequate control of the disease and reduced crop yields.

It has been found that satisfactory results are obtained when at least from about 0.2 pound to about 2.0 pounds of the principal active ingredient are applied per acre in each application to the rice plants being treated. Optimal results are obtained when from at least about 0.3 pound to about 1.5 pounds of active ingredient per acre are employed in each application. The compositions of this invention may be applied during a period when ground applicators cannot be employed and hence application may be made by aircraft. However, regardless of how the skilled worker desires to make such applications, it is preferred that uniform distribution of the compositions in the field be had.

In addition to the foregoing, it is generally recognized that the presence of a source of nitrogen, i.e. nitrogen fertilizers, in the rice plant plots greatly increases the severity of any rice blast disease infection. However, in the practice of this invention it has been surprisingly discovered that very effective control of rice blast disease can be obtained even in the presence of very high concentrations of a nitrogen source, e.g. nitrogen fertilizers, even concentrations of upwards of one hundred pounds of nitrogen per acre of rice plant sought to be treated.

The invention may be illustrated by the following examples.

EXAMPLE 1

To 750 parts of technical triphenyltin hydroxide contained in a dry blender are added 30 parts of sodium lignin sulfonate, 45 parts sulfonated aliphatic polyester and 765 parts kaolinite. After premixing, the mixture is ground in a hammer mill to a fineness of 98% minimum passing a 325 mesh screen. The resulting product is a water dispersible powder containing 50% active ingredient. The 50% wettable powder is dispersed and suspended in water to prepare a ready-to-use spray of the desired active ingredient content just prior to field application.

EXAMPLE 2

A dust containing 3% by weight of the active ingredient is prepared by blending 120 parts of 50% wettable powder as described in Example 1 and 1880 parts of soapstone talc in a ribbon mixer. The dust is applied directly to rice plants.

EXAMPLE 3

A flowable formulation containing 2 lbs. per gallon of active ingredient is prepared by milling to an average particle diameter of 1–3 microns by conventional methods, such as ball milling or sand milling, 215 lbs. of technical triphenyltin acetate, 200 lbs. of 5% aqueous dispersion of refined isomorphous clay, 30 lbs. of alkyl aryl polyether alcohol, 10 lbs. of polyethylene glycol fatty esters, 35 lbs. of potato starch, 47 lbs. of sodium carbonate, and 463 lbs. of water.

The resulting liquid formulation is diluted with water to prepare a ready-to-use spray of the desired active ingredient content just before application in the field.

EXAMPLE 4

Tests were conducted to determine the ability of certain materials to control rice blast disease in small farm plots. Results with phenyl mercuric acetate, at present the most effective chemical known in treatment of the disease was used as a standard of comparison. All materials were applied with a knap-sack sprayer with a five nozzle boom at the rate of 30 gallons per acre. Individual test plots measured eight feet by fifteen feet. The results as to reduction of rotten-neck panicles are reported below in Table 1:

TABLE 1

| Material | Rate/acre | Mean number of infected panicles per test plot | | | |
|---|---|---|---|---|---|
| | | Time of application [1] | | | |
| | | 1 | 2 | 3 | 4 |
| None (1) | | 40 | 38 | 39 | 40 |
| Triphenyltinhydroxide, pounds | 2 | 36 | 34 | 17 | 20 |
| Phenylmercuricacetate, part | 0.25 | 33 | 31 | 13 | 18 |
| Blasticidin | ([2]) | 34 | 33 | 31 | 30 |
| Actidione, grams | 11.3 | 37 | 30 | 26 | 27 |
| Triphenyltinhydroxide, part | 1 | 42 | 41 | 26 | |
| Phenylmercuricacetate, part | 0.25 | 38 | 21 | 9 | |

[1] 1=Application at "tillering" stage only.
2=Application at "tillering and booting" stages only.
3=Application at tillering, booting and heading stages only.
4=Application at "heading" stage only.
[2] 1 lb. of 2% a.i.

EXAMPLE 5

An aqueous spray composition prepared from the ingredients set forth below were applied with a five nozzle boom to test plots of rice plants at the rate of 30 gallons per acre. The materials were applied at four different periods of the plant's life cycle; (1) "tillering" only; (2) "booting" only; (3) "booting and heading" only; and (4) "heading" only. The control of rice blast disease as measured by the number of rotten-neck panicles the test materials is reported in Table 2 below:

TABLE 2

| Test material | Rate/acre | Mean rotten neck panicles per treatment[1] | | | |
|---|---|---|---|---|---|
| | | 1 | 2 | 3 | 4 |
| Triphenyltin hydroxide, pound | 1 | 36.3 | 29.0 | 13.6 | 18.6 |
| Triphenyltin hydroxide, pound | 2 | 32.6 | 23.3 | 12.6 | 14.6 |
| Blasticidin S | ([2]) | 31.3 | 32.6 | 22.0 | 32.6 |
| Phenyl mercuric acetate, part | .25 | 37.3 | 24.3 | 19.6 | 24.0 |
| Control | | 38.0 | 38.0 | 38.0 | 38.0 |

[1] 1 "Tillering" only; 2 "booting" only; 3 "booting and heading" only 4, "heading" only.
[2] 3 lbs. of 2% a.i.

EXAMPLE 6

Test plots of rice plants were sprayed at various times with aqueous compositions containing 1.5 pounds per acre of triphenyltin hydroxide. Concurrently, the test plots were treated with sources of nitrogen fertilizer at the following levels, 0, 50, 100 and 150 pounds per acre. The effectiveness of the control of rice blast disease in each plot was determined by the mean number of rotten-neck panicles present and the yields of the rice obtained. The results obtained are set forth below in Tables 3 and 4:

TABLE 3

| | Total rotten neck panicles per treatment[1] | | |
|---|---|---|---|
| | 1 | 2 | 3 |
| Nitrogen (lbs.)/acre: | | | |
| 0 | 152 | 88 | 209 |
| 50 | 172 | 81 | 259 |
| 100 | 217 | 133 | 357 |
| 150 | 285 | 165 | 435 |

[1] 1 Triphenyltin hydroxide applied at "booting" only.
2 Triphenyltin hydroxide applied at "booting and heading" only.
3 Control, no triphenyltin hydroxide applied.

TABLE 4

| | Rough rice yields (lbs./acre) | | | | |
|---|---|---|---|---|---|
| | Replicates | | | | Average yield |
| | A | B | C | D | |
| Treatments[1]: | | | | | |
| 1-a | 1,863 | 2,074 | 1,904 | 1,718 | 1,890 |
| 1-b | 2,916 | 3,070 | 2,539 | 2,829 | 2,839 |
| 1-c | 3,618 | 3,107 | 3,821 | 3,618 | 3,341 |
| 1-d | 3,335 | 3,626 | 3,452 | 3,961 | 3,394 |
| 2-a | 1,783 | 2,062 | 1,834 | 1,601 | 1,820 |
| 2-b | 3,244 | 2,846 | 3,215 | 2,751 | 3,014 |
| 2-c | 3,576 | 3,717 | 3,306 | 3,618 | 3,554 |
| 2-d | 3,456 | 3,290 | 4,534 | 3,763 | 3,761 |
| 3-a | 1,817 | 2,095 | 1,854 | 2,066 | 1,958 |
| 3-b | 2,614 | 2,240 | 1,896 | 2,315 | 2,266 |
| 3-c | 3,074 | 3,568 | 3,078 | 2,560 | 3,070 |
| 3-d | 2,672 | 2,958 | 2,547 | 2,941 | 2,780 |

[1] 1=Triphenyltin hydroxide applied at "booting" only.
2=Triphenyl hydroxide applied at "booting and heading" only.
3=Control, no triphenyltin hydroxide applied.
a, 0 pounds of nitrogen per acre.
b, 50 pounds of nitrogen per acre.
c, 100 pounds of nitrogen per acre.
d, 150 pounds of nitrogen per acre.

What is claimed is:

1. A method of controlling rice blast disease consisting essentially of periodically applying to rice plants infected with rice blast disease when:

(a) the said rice plants are in the booting stage; and again when (b) the said rice plants are in the heading stage; a small but effective amount of a composition comprising as its principal active ingredient, 1 or 2 pounds per acre of a compound of the formula:

$$R-\underset{\underset{R}{|}}{\overset{\overset{R}{|}}{Sn}}-X$$

wherein each R is phenyl; and X is selected from the group consisting of halo, acyloxy and hydroxy; said active ingredient dispersed in a suitable extending agent.

2. The method of claim 1, wherein the composition is applied to the rice plants in the presence of a substantial amount of a source of nitrogen.

3. The method of claim 1, wherein the compound is triphenyltin hydroxy.

4. The method of claim 1, wherein X is selected from the group consisting of chloro, acetoxy and hydroxy.

5. The method of claim 1, wherein the compound is triphenyltin acetate.

References Cited

UNITED STATES PATENTS 3,113,069  12/1963  Sijpesteijn.
3,140,977  7/1964  Duyfjes.

FOREIGN PATENTS 946,770  1/1964  Great Britain.

ALBERT T. MEYERS, Primary Examiner
S. J. FRIEDMAN, Assistant Examiner